United States Patent
Wong et al.

(10) Patent No.: US 7,432,837 B2
(45) Date of Patent: Oct. 7, 2008

(54) SYSTEM AND METHOD FOR CORRECTING DC OFFSET

(75) Inventors: Kwo-Jyr Wong, Taipei Hsien (TW); Jane-Yi Pieh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/616,868

(22) Filed: Dec. 28, 2006

(65) Prior Publication Data

US 2007/0229334 A1    Oct. 4, 2007

(30) Foreign Application Priority Data

Mar. 31, 2006    (TW) .................................. 95111407

(51) Int. Cl.
*H03M 1/06* (2006.01)
(52) U.S. Cl. ...................... 341/118; 341/117; 341/119; 341/120
(58) Field of Classification Search ................ 375/296; 455/126; 341/117–120
See application file for complete search history.

(56) References Cited

U.S. PATENT DOCUMENTS 6,745,015 B2 *  6/2004  Yochem ...................... 455/126
6,771,709 B2 *  8/2004  Huang et al. ................ 375/296

FOREIGN PATENT DOCUMENTS

CN         1531774        9/2004

* cited by examiner

*Primary Examiner*—Jean B Jeanglaude
(74) *Attorney, Agent, or Firm*—Wei Te Chung

(57) ABSTRACT

A system for correcting a DC offset includes a digital-to-analog (D/A) converter module (30), a summing circuit (40), an inphase-to-quadrature (I/Q) modulator (50), a spectrum analyzer module (60) and a DC offset correction module (70). The D/A converter module converts digital control signals to analog control signals, and outputs DC offset regulating signals. The summing circuit respectively sums up the DC offset regulating signals and corresponding vectors of a base band signal. The I/Q modulator receives the summed base band signal, and converts the summed base band signal to a radio frequency (RF) signal. The spectrum analyzer module analyzes an energy variation according to a DC offset contained in the RF signal. The DC offset correction module outputs the digital control signals to adjust the DC offset regulating signals, thereby obtaining the lowest energy variation.

19 Claims, 7 Drawing Sheets

SYSTEM AND METHOD FOR CORRECTING DC OFFSET

BACKGROUND OF THE INVENTION

1. Field of the Invention

The invention relates to systems and methods for correcting DC offset, and particularly to a system and method for correcting DC offset in a wireless communication system.

2. Description of Related Art

In a wireless communication system, a base band signal is modulated to a radio frequency (RF) signal via a modulator, and then coupled to an antenna and transmitted. However, DC offset can be generated in the modulator, so that energy is consumed when the RF signal is transmitted. For example, in a mobile phone, lifetime of a battery is shortened by power loss due to DC offset, thereby reducing standby time of the mobile phone.

SUMMARY OF THE INVENTION

An exemplary embodiment of the invention provides a system for correcting DC offset. The system includes a digital-to-analog (D/A) converter module, a summing circuit, an inphase-to-quadrature (I/Q) modulator, a spectrum analyzer module and a DC offset correcting module. The D/A converter module converts digital control signals to analog control signals, and outputs DC offset regulating signals. The summing circuit respectively sums the DC offset regulating signals and corresponding vectors of a base band signal. The I/Q modulator receives the summed base band signal, and converts the summed base band signal to a radio frequency (RF) signal. The spectrum analyzer module analyzes an energy variation indication signal indicating an amount of DC offset contained in the RF signal. The DC offset correction module outputs the digital control signal to adjust the DC offset regulating signals, thereby obtaining the lowest energy variation.

Another exemplary embodiment of the present invention provides a method for correcting DC offset. The method includes steps of: initializing DC offset regulating signals; reading an initial energy variation; storing the initial energy variation; maintaining a first group of DC offset regulating signals and adjusting a second group of DC offset regulating signals to obtain a first lowest-energy variation; maintaining a first group of DC offset regulating signals and one of the second group of DC offset regulating signals, and adjusting the other one of the regulated second group of DC offset regulating signals to obtain a second lowest-energy variation; maintaining a second group of DC offset regulating signals and adjusting a first of DC offset regulating signals to obtain a third lowest-energy variation; and maintaining the regulated second group of DC offset regulating signals and one of the regulated first group of DC offset regulating signals, and adjusting the other one of the regulated first group of DC offset regulating signals to obtain a fourth lowest-energy variation.

Other advantages and novel features will become more apparent from the following detailed description of preferred embodiments when taken in conjunction with the accompanying drawings, in which:

DETAILED DESCRIPTION OF THE INVENTION

Figure 1:
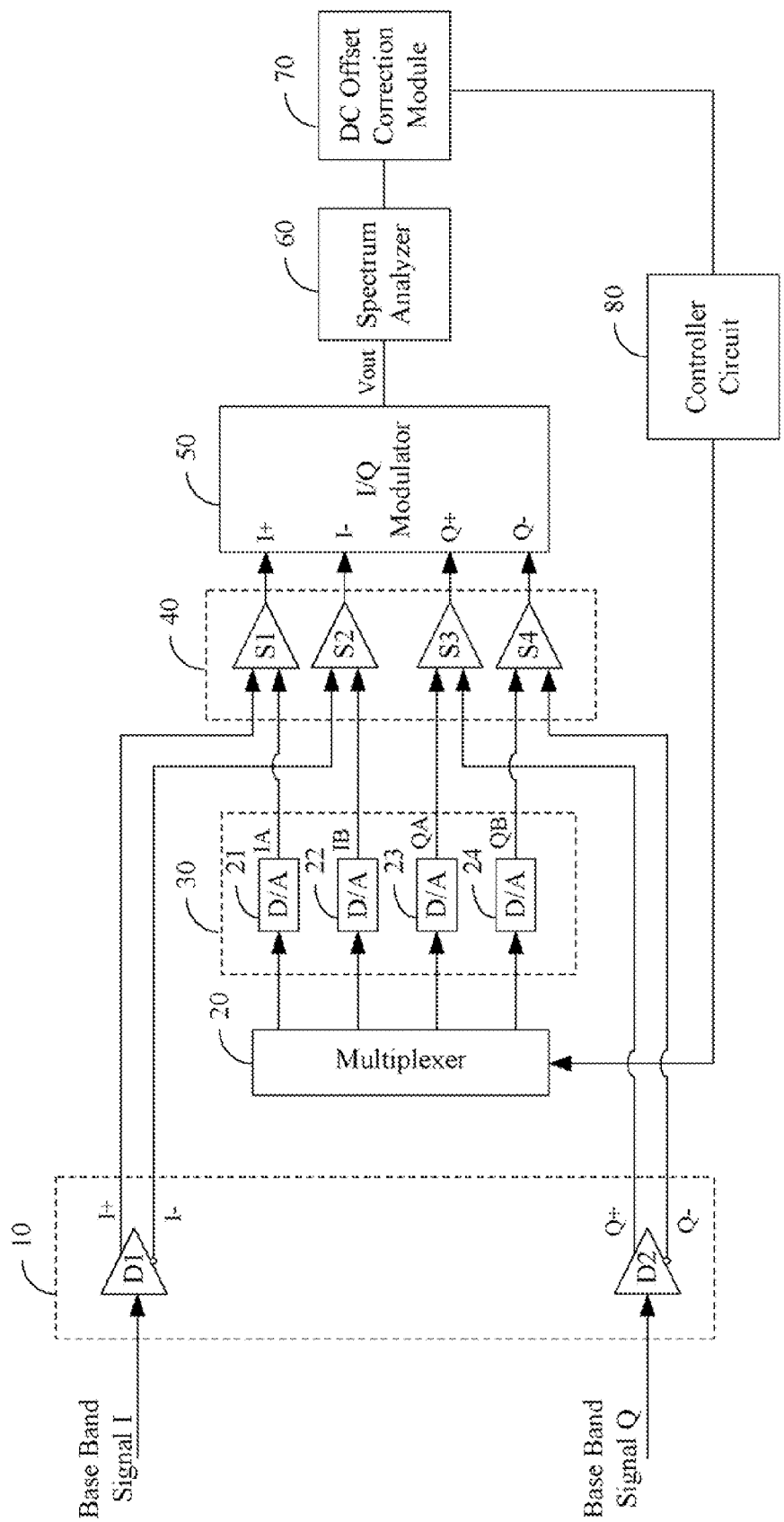
FIG. 1 is a block diagram of a system for correcting DC offset of an exemplary embodiment of the present invention.

FIG. 1 is a system for correcting DC offset of an exemplary embodiment of the present invention. The system includes a differential amplifier module 10, a multiplexer 20, a digital-to-analog (D/A) converter module 30, a summing circuit 40, an inphase-to-quadrature (I/Q) modulator 50, a spectrum analyzer 60, a DC offset correction module 70 and a converter circuit 80.

The differential amplifier module 10 includes two differential amplifiers D1 and D2, for converting a received base band signal to a differential base band signal. Normally, the base band signal includes vectors I and Q. In the exemplary embodiment, the differential amplifier D1 receives the vector I, and the differential amplifier D2 receives the vector Q. The vectors I and Q are correspondingly converted to differential vectors I+, I− and Q+, Q−.

The D/A converter module 30 includes a plurality of D/A converters 21, 22, 23 and 24, which convert digital DC offset regulating signals to analog DC offset regulating signals. In the exemplary embodiment, the analog DC offset regulating signals output from the D/A converters 21, 22, 23 and 24 are IA, IB, QA and QB. The DC offset regulating signals IA and IB are defined as a first group of DC offset regulating signals, the DC offset regulating signals QA and QB are defined as a second group of DC offset regulating signals.

The summing circuit 40 includes a plurality of summators S1, S2, S3 and S4, which sum up the DC offset regulating signals IA, IB, QA and QB and the corresponding differential base band signal vectors I+, I−, Q+ and Q−, and transmit the summed differential base band signal vectors to corresponding pins I+, I−, Q+ and Q− of the I/Q modulator 50. That is, the first summator S1 sums up the DC offset regulating signal IA and the differential base band signal vector I+, and transmits that sum to the pin I+ of the I/Q modulator 50. The second summator S2 sums up the DC offset regulating signal IB and the differential base band signal vector I−, and transmits that sum to the pin I− of the I/Q modulator 50. The third summator S3 sums up the DC offset regulating signal QA and the differential base band signal vector Q+, and transmits that sum to the pin Q+ of the I/Q modulator 50. The fourth summator S4 sums the DC offset regulating signal QB and the differential base band signal vector Q−, and transmits that sum to the pin Q− of the I/Q modulator 50.

The I/Q modulator 50 converts the summed differential base band signal to a radio frequency (RF) signal. In the exemplary embodiment, the I/Q modulator 50 is a differential modulator, and input signals are differential signals. Therefore, the input base band signal is converted to the differential signal via the differential amplifier module 10, and then transmitted to the I/Q modulator 50.

In alternative embodiments, the I/Q modulator 50 need not be a differential I/Q modulator, thus, the differential amplifier module 10 can be omitted as a base band signal is not converted to a differential signal, and can be directly transmitted to the I/Q modulator 50.

The spectrum analyzer 60 analyzes an energy variation according to DC offset contained in the RF signal output from the I/Q modulator 50. Factors influencing the energy variation include DC offset, thermal noise and so on. However, in a perfect environment, average energy variation affected by the factors without the DC offset is nearly zero, and is distributed in a Gaussian curve, the energy variation analyzed by the spectrum analyzer 60 then, is only related to DC offset, and directly varies with DC offset.

The controller circuit 80 is connected to the DC offset correction module 70. The multiplexer 20 is connected between the controller circuit 80 and the D/A converter module 30. In the exemplary embodiment, the DC offset correction module 70 reads the energy variation due to the DC offset, and outputs digital DC offset regulating signals to the D/A converter module 30 via the controller circuit 80 and the multiplexer 20. Then, the D/A converter module 30 converts the digital DC offset regulating signals to analog DC offset regulating signals IA, IB, QA and QB. Thus, the DC offset can be adjusted according to the analog DC offset regulating signals IA, IB, QA and QB.

Because the digital DC offset regulating signal IA, IB, QA or QB output from the DC correction module 70 is an RF related digital signal, but the D/A converter module 30 receives a base band signal, the converter circuit 80 converts the RF related digital signal to a base band signal, and transmits the base band signal to the D/A converter module 30 via the multiplexer 20.

In the exemplary embodiment, the spectrum analyzer 60 also outputs a digital signal indicating an energy variation via a communication port, such as an IEEE-488 bus. The DC offset correction module 70 can be a PC or microcontroller, which receives the digital signal via the IEEE-488 bus.

In the exemplary embodiment, the converter circuit 80 can be an I/Q demodulator. In an alternative embodiment, the converter circuit 80 can be some other kind of converter circuit.

In order to save power during communications, the system must correct DC offset generated in the I/Q modulator 50 before communication occurs.

Figure 2:
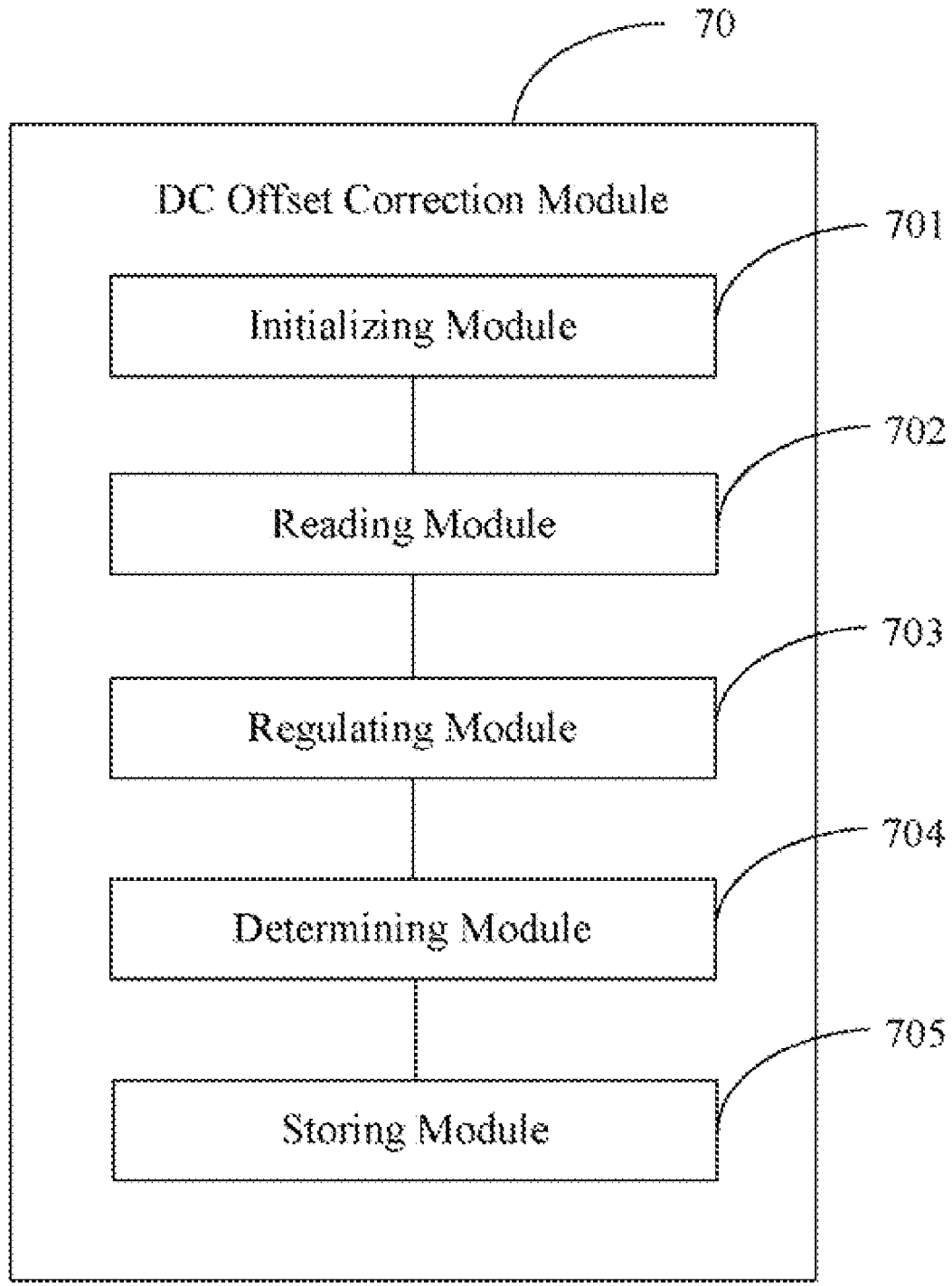
FIG. 2 is a block diagram of a DC offset correction module of FIG. 1 of the present invention.

FIG. 2 is a block diagram of the DC offset correction module 70. The DC offset correction module 70 includes an initializing module 701, a reading module 702, a regulating module 703, a determining module 704, and a storing module 705.

The initializing module 701 sets the DC offset regulating signals IA, IB, QA, and QB to the same pre-determined initial value. In the exemplary embodiment, the pre-determined initial value can be an experiential value, or a median value of an output range of the D/A converters. If the D/A converters 21, 22, 23 and 24 have the same characteristic, the median values of the output range thereof are also the same. In the exemplary embodiment, the D/A converters are 3-bit D/A converters and the output ranges thereof are (−5, 5). Therefore, the D/A converter correspondingly should have eight digital inputs as follows: 011, 010, 001, 000, 100, 101, 110 and 111, which is an arithmetic sequence, and δ is defined as a common difference thereof. In addition, the eight digital inputs correspond to eight output analog DC offset regulating signals. Correspondingly, the analog DC offset regulating signals are evenly distributed in the output range. According to the characteristic of the converters 21, 22, 23 and 24, the digital input 000 is defined as a median value. Therefore, the pre-determined initial values of the D/A converters 21, 22, 23 and 24 are 000. In the exemplary embodiment, 011, 010, 001 are defined as negative values, and 100, 101, 110, 111 are defined as positive values. The DC offset can be adjusted eight times. In alternative embodiments, the pre-determined value can be another value, depending on the characteristics of the converters.

Then, the I/Q modulator 50 outputs an initial RF signal according to the pre-determined initial DC offset regulating signals IA, IB, QA, and QB. If the system doesn't have DC offset, then no signal is output to the DC offset correction module 70. If there is DC offset present in the system, the reading module 702 reads an initial energy variation corresponding to DC offset contained in the initial RF signal. Then, the storing module 705 stores the initial energy variation. The regulating module 703 adjusts the DC offset regulating signals IA, IB, QA and QB until the determining module 704 obtains a lowest energy variation.

Firstly, the regulating module 703 maintains the first group of DC offset regulating signals IA and IB at the pre-determined initial value, that is, IA=000, IB=000, and adjusts the second group of DC offset regulating signals QA and QB.

Exemplary processes of adjustment and determination are as follows. In the exemplary embodiment, a variable x1 is added to the second group of DC offset regulating signals QA and QB. In addition, the variable x1 =[−3δ, −2δ, −δ, δ, 2δ, 3δ, 4δ], in which [−3δ, −2δ, −δ] are defined as a first group of x1, and [δ, 2δ, 3δ, 4δ] are defined as a second group of x1. In alternative embodiments, [δ, 2δ, 3δ, 4δ] are defined as a first group of x1, and [−3δ, −2δ, −δ] are defined as a second group of x1. First of all, the reading module 702 reads one member in the first group of x1. The second group of DC offset regulating signals are converted to [QA+x1] and [QB+x1]. For example, x1 is equal to δ, and the second group of DC offset regulating signals are adjusted from 000, 000 to 100, 100. Consequently, the I/Q modulator 50 outputs a RF signal, and then the spectrum analyzer 60 analyzes an energy variation corresponding to the DC offset regulating signals 000, 000, 100, and 100. Correspondingly, the reading module 702 reads the energy variation. The determining module 704 determines whether the energy variation is smaller than the initial energy variation.

If the energy variation corresponding to the DC offset regulating signals 000, 000, 100, 100 is smaller than the initial energy variation, the storing module 705 stores the energy variation corresponding to the DC offset regulating signals 000, 000, 100, 100. Then, the reading module 702 reads another member in the first group x1, such as 2δ. The regulating module 703 then adjusts the second group of DC offset regulating signals from 100, 100 to 101, 101. Similarly, the reading module 702 reads another energy variation. Then, the determining module 704 determines whether the energy variation corresponding to the DC offset regulating signals 000, 000, 101, 101 is smaller than the previous one. If the energy variation corresponding to the DC offset regulating signals 000, 000, 101, 101 is greater than the previous one, the previous energy variation, corresponding to IA, IB, [QA+x1] and [QB+x1] is determined to be the lowest energy variation attainable. If the energy variation corresponding to the DC offset regulating signals 000, 000, 101, 101 is smaller than the previous one, the storing module 705 stores the energy variation corresponding to the DC offset regulating signals 000, 000, 101, 101 to replace the previous one, and the reading module 702 reads another member in the first group x1 until the lowest energy variation corresponding to DC offset regulating signals IA, IB, [QA+x1] and [QB+x1] is determined. In the exemplary embodiment, the storing module 705 always stores the current lower energy variation.

Contrarily, if the energy variation corresponding to the DC offset regulating signals 000, 000, 100, 100 is greater than the initial energy variation, the storing module 705 does not store the energy variation corresponding to the DC offset regulating signals 000, 000, 100, 100. The reading module 702 reads one member in the second group x1, such as: $-\delta$, and then the second group of the DC offset regulating signal are adjusted from 000, 000 to 001, 001. Correspondingly, the reading module 702 reads an energy variation corresponding to 000, 000, 001, 001. The determining module 704 determines whether the energy variation corresponding to 000, 000, 001, 001 is smaller than the initial energy variation. If the energy variation corresponding to 000, 000, 001, 001 is also greater than the initial energy variation, the initial energy variation corresponding to the DC offset regulating signals IA, IB, [QA+x1] and [QB+x1] is determined to be the lowest one available. If the energy variation corresponding to 000, 000, 001, 001 is smaller than the initial energy variation, the storing module 705 stores the energy variation corresponding to 000, 000, 001, 001. Then, the reading module 702 reads another member in the second group x1 until the lowest energy variation corresponding to the DC offset regulating signals IA, IB, [QA+x1] and [QB+x1] is determined. In this process, a first lowest energy variation is determined, which is corresponding to the DC offset regulating signals IA, IB, [QA+x1] and [QB+X1].

Secondly, when the determining module 704 determines the first lowest energy variation, the regulating module 703 also maintains the first group of DC offset regulating signals IA and IB at the pre-determined initial value and maintains one of the regulated second group of DC offset regulating signals at the same time, and adjusts the other one of the regulated second group of DC offset regulating signals. In the exemplary embodiment, DC offset regulating signal [QA+x1] is maintained, which is corresponding to the DC offset regulating signal of the first energy variation, and the DC offset regulating signal [QB+x1] is adjusted. That is, a variable y1 is added to the DC offset regulating signal [QB+x1]. The variation y1 = $[-3\delta, -2\delta, -\delta, \delta, 2\delta, 3\delta, 4\delta]$, where $[-3\delta, -2\delta, -\delta]$ are defined as a first group of y1, and $[\delta, 2\delta, 3\delta, 4\delta]$ are defined as a second group of y1. Similarly, in alternative embodiments, $[\delta, 2\delta, 3\delta, 4\delta]$ are defined as a first group of y1, and $[-3\delta, -2\delta, -\delta]$ are defined as a second group of y1. Therefore, the DC offset regulating signal is converted to [QB+x1+y1]. Consequently, the reading module 702 reads energy variations according to different values of y1. Then, the regulating module 703 adjusts y1 until a second lowest-energy variation corresponding to the DC offset regulating signals IA, IB, [QA+x1], [QB+x1+y1] is achieved. Processes of adjustment and determination are the same as those described above. In the exemplary embodiment, the second energy variation is smaller than the first energy variation.

Thirdly, when a third lowest energy variation is determined, the regulating module 703 maintains the regulated second group of DC offset regulating signals, corresponding to the DC offset regulating signals of the second lowest energy variation, and adjusts the first group of DC offset regulating signals from IA and IB to [IA+x2] and [IB+x2]. Similarly, the variable x2=$[-3\delta, -2\delta, -\delta, \delta, 2\delta, 3\delta, 4\delta]$, where $[-3\delta, -2\delta, -\delta]$ are defined as a first group of x2, and $[\delta, 2\delta, 3\delta, 4\delta]$ are defined as a second group of x2. In alternative embodiments, $[\delta, 2\delta, 3\delta, 4\delta]$ are defined as a first group of x2, and $[-3\delta, -2\delta, -\delta]$ are defined as a second group of x2. Consequently, the reading module 702 reads energy variations according to different values of x2. The regulating module 703 adjusts x2 until a third lowest-energy variation corresponding to the DC offset regulating signals [IA+x2], [IB+x2], [QA+x1], [QB+x1+y1] is achieved. Processes of adjustment and determination are the same as those described above. In the exemplary embodiment, the third energy variation is smaller than the second energy variation.

Fourthly, when the determining module 704 determines the third lowest energy variation, the regulating module 703 maintains the second group of DC offset regulating signals and one of the regulated the first group of DC offset regulating signals, and adjusts the other one of the regulated first group of DC offset regulating signals. In the exemplary embodiment, DC offset regulating signal [IA+x2] is maintained, which corresponds to the DC offset regulating signals of the third energy variation, and the DC offset regulating signal [IB+x2] is adjusted. That is, a variable y2 is added to the DC offset regulating signal [IB+x2]. the variable y2=$[-3\delta, -2\delta, -\delta, \delta, 2\delta, 3\delta, 4\delta]$, where $[-3\delta, -2\delta, -\delta]$ are defined as a first group of y2, and $[\delta, 2\delta, 3\delta, 4\delta]$ are defined as a second group of y2. Similarly, in alternative embodiments, $[\delta, 2\delta, 3\delta, 4\delta]$ are defined as a first group of y2, and $[-3\delta, -2, -\delta]$ are defined as a second group of y2. Therefore, the DC offset regulating signal is converted to [IB+x2+y2]. Consequently, the reading module 702 reads energy variations according to different values of y2. The regulating module 703 adjusts y2 until a fourth lowest-energy variation corresponding to the DC offset regulating signals [IA+x2], [IB+x2+y2], [QA+x1], [QB+x1+y1] is achieved. Processes of adjustment and determination are the same as those described above. In the exemplary embodiment, the fourth energy variation is smaller than the third energy variation.

Finally, the fourth energy variation corresponding to the DC offset regulating signals [IA+x2], [IB+x2+y2], [QA+x1], [QB+x1+y1] is the lowest one available in the system. In addition, the digital DC offset regulating signals [IA+x2], [IB+x2+y2], [QA+x1] and [QB+x1+y1] are best DC offset regulating signals, which are transmitted to the D/A converter module 30. Therefore, the base band signal is converted to an energy saving RF signal.

In an alternative embodiment, the regulating module 703 may maintain the second group of DC offset regulating signals, and adjust the first group of DC offset regulating signals to obtain the lowest DC offset. The exemplary embodiment does not limit adjusting time of the energy variation, which can be varied according to actual situations.

Figure 3:
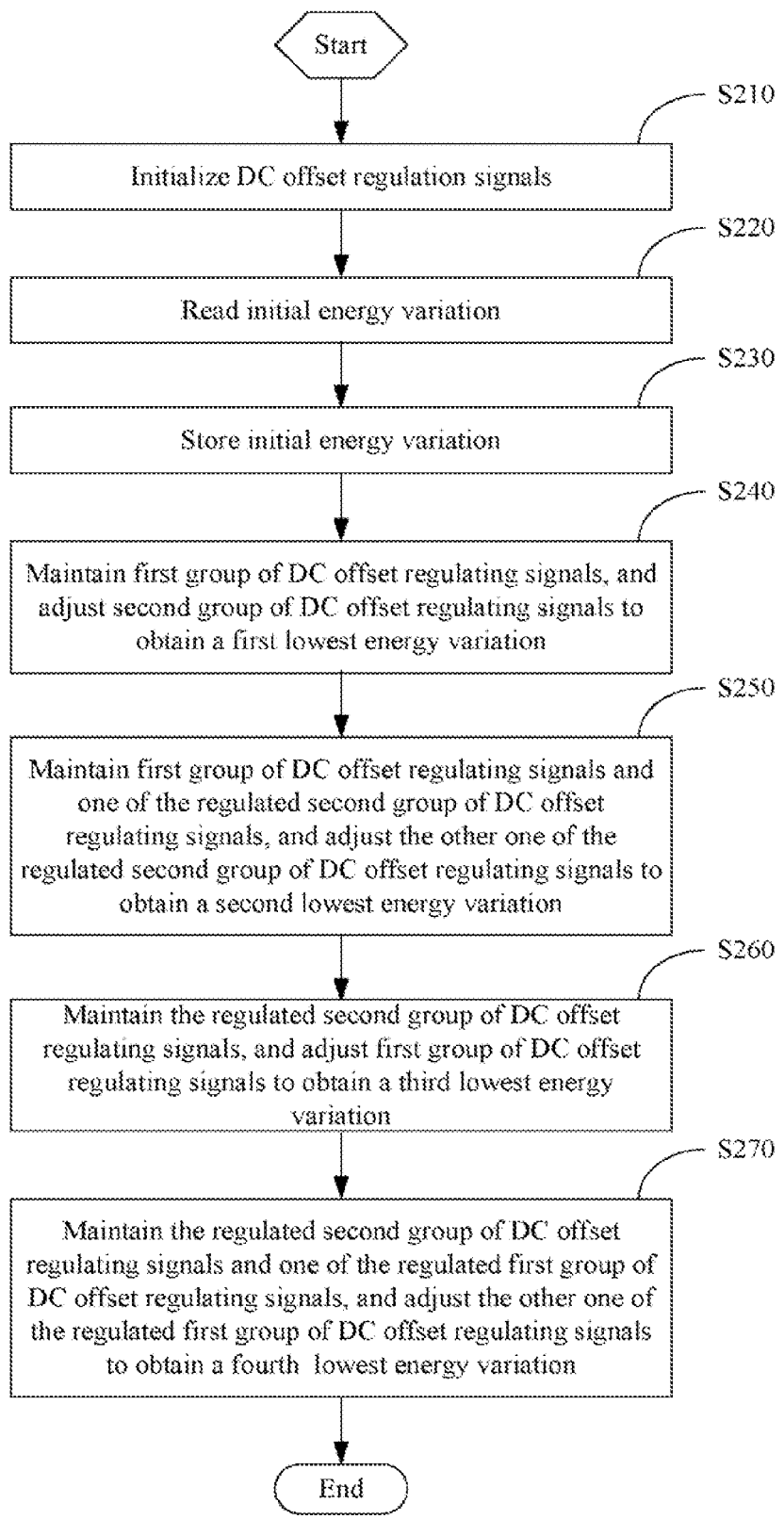
FIG. 3 is a flowchart of a method for correcting DC offset of an exemplary embodiment of the present invention.

FIG. 3 is a flowchart of a method for correcting DC offset of an exemplary embodiment of the present invention. In step S210, the initializing module 701 initializes the DC offset regulating signals IA, IB, QA and QB to the same pre-determined initial value. In step S220, the reading module 702 reads an initial energy variation analyzed by the spectrum analyzer 60, which is corresponding to an initial RF signal. In step S230, the storing module 705 stores the initial energy variation. In step S240, the regulating module 703 maintains the first group of DC offset regulating signals at the pre-determined initial value, and adjusts the second group of DC offset regulating signals to obtain a first lowest-energy variation. In step S250, the regulating module 703 not only maintains the first group of DC offset regulating signals at the pre-determined initial value, but also maintains one of the regulated second group of DC offset regulating signals, and at the same time, adjusts the other one of the regulated second group of DC offset regulating signals to obtain a second lowest-energy variation. In step S260, the regulating module 703 maintains the regulated second group of DC offset regulating signals, and adjusts the first group of DC offset regulating signals to obtain a third lowest-energy variation. In step S270, the regulating module 703 not only maintains the regulated second group of DC offset regulating signals, but also maintains one of the regulated first of DC offset regulating signals, and at the same time, adjusts the other one of the regulated first group of DC offset regulating signals to obtain a fourth lowest-energy variation.

In another exemplary embodiment, steps S240 and S260 can be exchanged, and steps S250 and S270 can also be exchanged.

Figure 4:
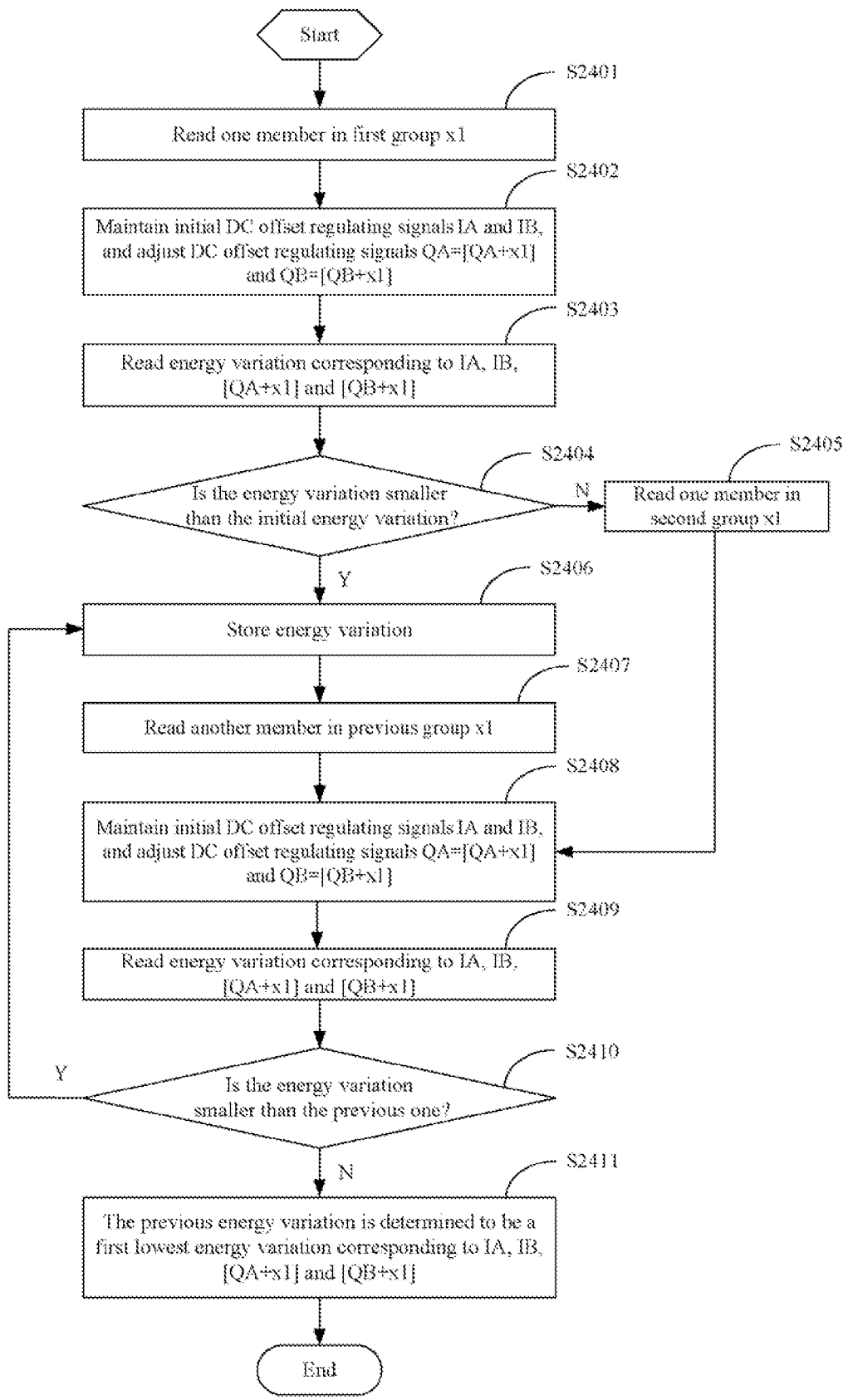
FIG. 4 is a detailed flowchart of a step S240 of FIG. 3 of the present invention.

FIG. 4 is a detailed flowchart of step S240 of FIG. 3 of the present invention. In step S2401, the reading module 702 reads one member of the first group x1, such as: δ. In step S2402, the regulating module 703 maintains the first group of the DC offset regulating signals to the pre-determined initial value, and adjusts DC offset regulating signals QA=[QA+x1] and QB=[QB+x1]. That is, the second group of DC offset regulating signals are adjusted from 000, 000 to 100, 100. In step S2403, the reading module 702 reads an energy variation corresponding to the DC offset regulating signals 000, 000, 100, 100. In step S2404, the determining module 704 determines whether the energy variation corresponding to the DC offset regulating signals 000, 000, 100, 100 is smaller than the initial energy variation.

In step S2406, if the energy variation corresponding to the DC offset regulating signals 000, 000, 100, 100 is smaller than the initial energy variation, the storing module 705 stores the energy variation corresponding to the DC offset regulating signals 000, 000, 100, 100. In step S2407, the reading module 702 reads another member, such as: 2δ, in the previous group x1, that is, the first group x1. In step S2408, the regulating module 703 also maintains the first group of DC offset regulating signals IA, IB at the pre-determined initial value, and adjusts the second group of the DC offset regulating signals from 100, 100 to 101, 101. In step S2409, the reading module 702 reads an energy variation corresponding to the DC offset regulating signals 000, 000, 101, 101. In step S2410, the determining module 704 determines whether the energy variation corresponding to the DC offset regulating signals 000, 000, 101, 101 is smaller than the previous one, that is, the energy variation corresponding to the DC offset regulating signal 000, 000, 100, 100. In step S2411, if the energy variation corresponding to the DC offset regulating signals 000, 000, 101, 101 is greater than the previous one, the previous energy variation is determined to be a first lowest-energy variation corresponding to IA, IB, [QA+x1], [QB+x1]. If the energy variation corresponding to 000, 000, 101, 101 is smaller than the previous one, return to step S2406.

In step S2405, if the energy variation corresponding to 000, 000, 100, 100 is greater than the initial energy variation, the reading module 702 reads one member in the second group x1, such as: −δ. Then, step S2408 is performed again.

Figure 5:
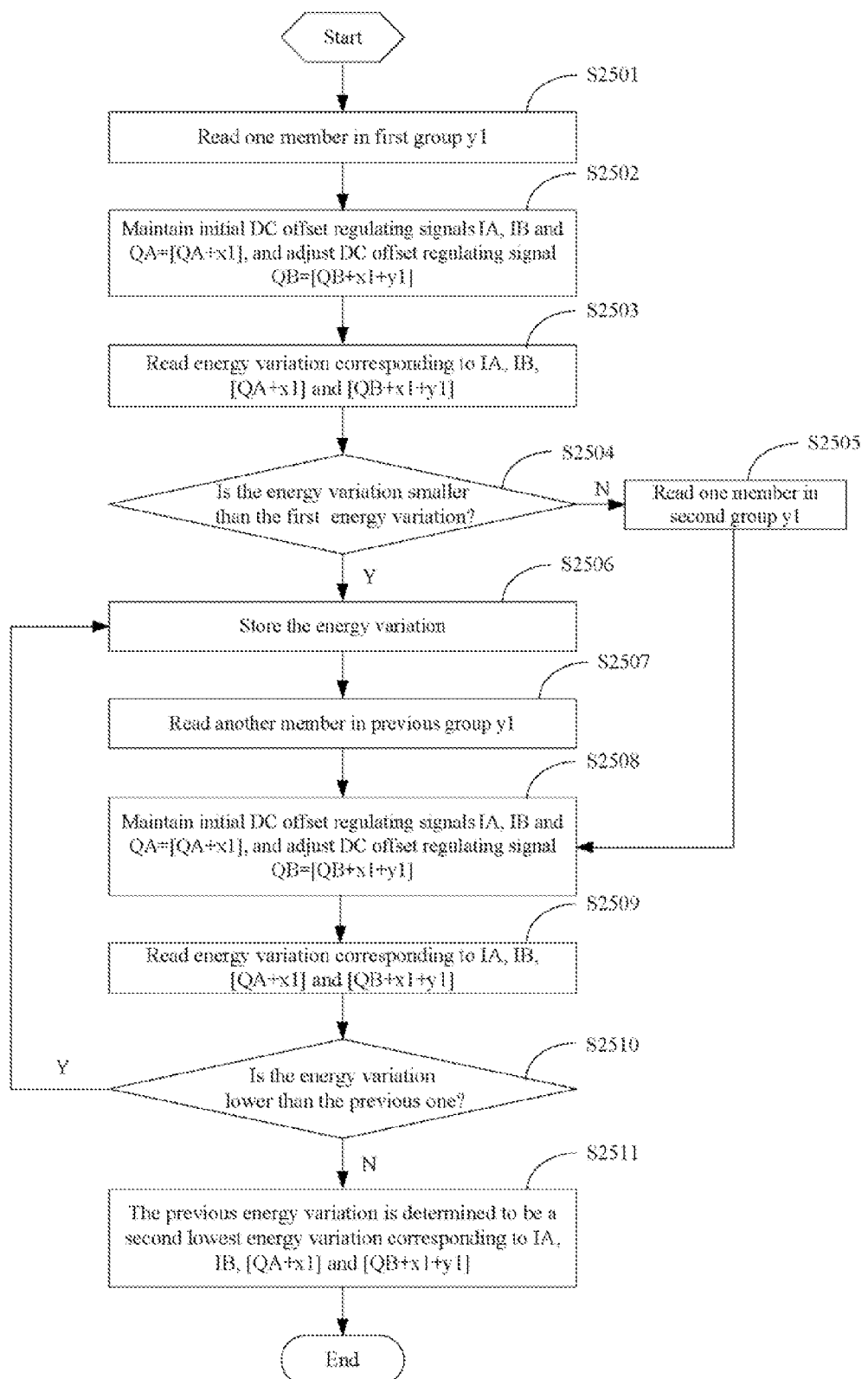
FIG. 5 is a detailed flowchart of a step S250 of FIG. 3 of the present invention.

FIG. 5 is a detailed flowchart of step S250 of FIG. 3 of the present invention. In step S2501, the reading module 702 reads one member of the first group y1, such as δ. In step S2502, the regulating module 703 maintains the first group of DC offset regulating signals at the pre-determined initial value and maintains one of the regulated first group of DC offset regulating signals, such as: [QA+x1], and adjusts the other one of the regulated first group of DC offset regulating signals, such as: QB=[QB+x1+y1], that is, QB=[QB+x1+δ]. In step S2503, the reading module 702 reads an energy variation corresponding to 000, 000, [QA+x1], [QB+x1+δ]. In step S2404, the determining module 704 determines whether the energy variation corresponding to 000, 000, [QA+x1], [QB+x1+δ] is smaller than the first lowest-energy variation.

In step S2506, if the energy variation corresponding to the DC offset regulating signals 000, 000, [QA+x1], [QB+x1+δ] is smaller than the first lowest energy variation, the storing module 705 stores the energy variation corresponding to the DC offset regulating signals 000, 000, [QA+x1], [QB+x1+δ]. In step S2507, the reading module 702 reads another member, such as: 2δ, in the previous group y1, that is, the first group y1. In step S2508, the regulating module 703 maintains the first group of DC offset regulating signals at the pre-determined initial value and maintains one of the regulated first group of DC offset regulating signals, such as: [QA+x1], and adjusts the other one of the regulated first group of DC offset regulating signals, such as: QB=[QB+x1+y1], that is, QB=[QB+x1+2δ]. In step S2509, the reading module 702 reads an energy variation corresponding to 000, 000, [QA+x1], [QB+x1+2δ]. In step S2510, the determining module 704 determines whether the energy variation corresponding to 000, 000, [QA+x1], [QB+x1+2δ] is smaller than the previous one, that is, the energy variation corresponding to the DC offset regulating signal 000, 000, [QA+x1], [QB+x1+δ]. In step S2511, if the energy variation corresponding to the DC offset regulating signals 000, 000, [QA+x1], [QB+x1+2δ] is greater than the previous one, the previous energy variation is determined to be a second lowest-energy variation corresponding to IA, IB, [QA+x1], [QB+x1+y1]. If the energy variation corresponding to 000, 000, [QA+x1], [QB+x1+2 δ] is smaller than the previous one, return to step S2506.

In step S2505, if the energy variation corresponding to 000, 000, [QA+x1], [QB+x1+δ] is greater than the first lowest-energy variation, the reading module 702 reads one member in the second group y1, such as: −δ. Then, step S2408 is performed again.

Figure 6:
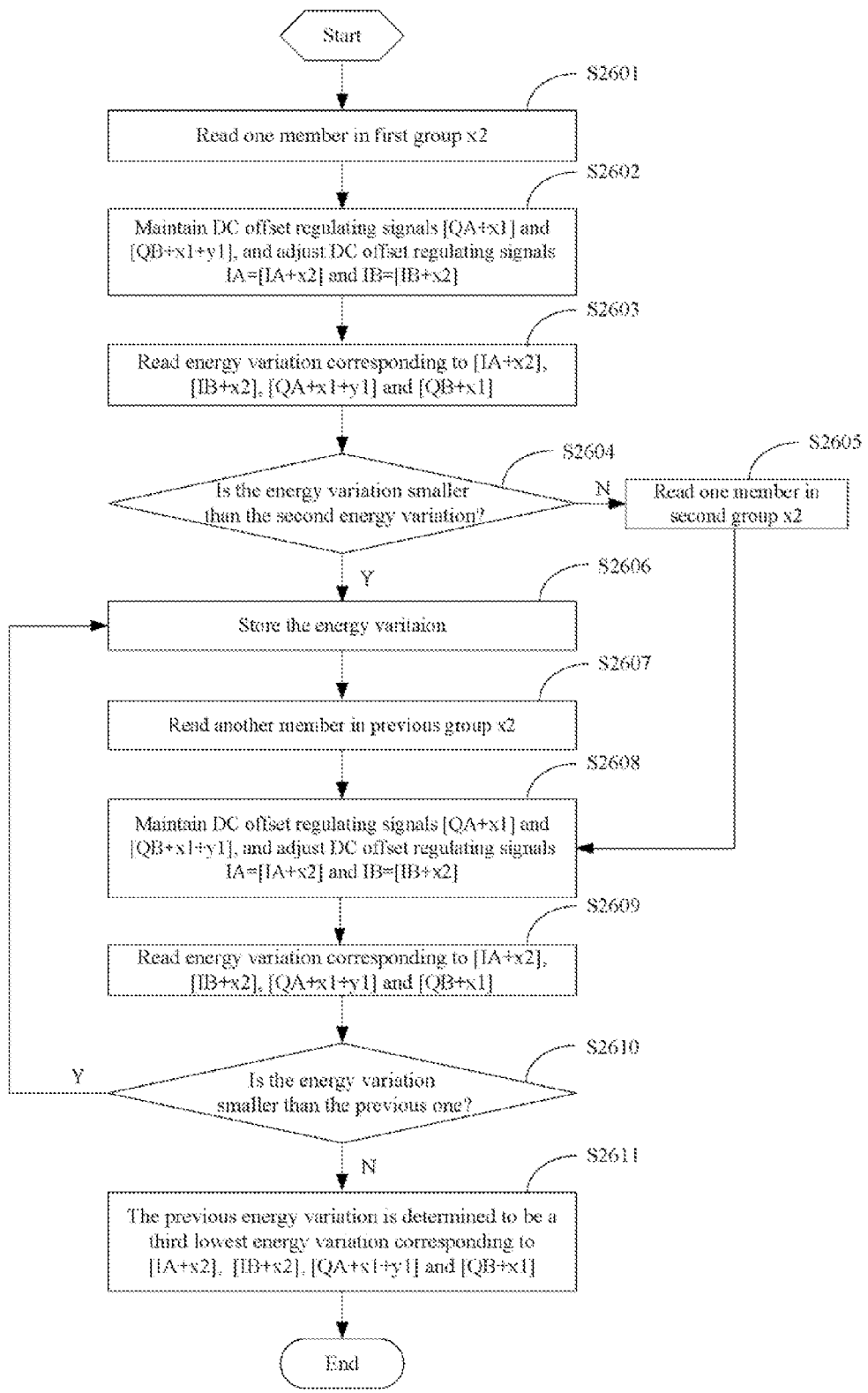
FIG. 6 is a detailed flowchart of a step S260 of FIG. 3 of the present invention.

FIG. 6 is a detailed flowchart of step S260 of FIG. 3 of the present invention. In step S2601, the reading module 702 read one data of the first group x2, such as δ. In step S2602, the regulating module 703 maintains the regulated second group of DC offset regulating signals, such as: QA=[QA+x1], QB=[QB+x1+y1], and adjusts the first group of DC offset regulating signals, such as: IA=[IA+x2] and IB=[IB+x2]. That is, the first group of the DC offset regulating signals are adjusted from 000, 000 to 100, 100. In step S2603, the reading module 702 reads an energy variation corresponding to the DC offset regulating signals 100, 100, [QA+x1], [QB+x1+y1]. In step S2604, the determining module 704 determines whether the energy variation corresponding to 100, 100, [QA+×1], [QB+x1+y1] is smaller than the second lowest-energy variation.

In step S2606, if the energy variation corresponding to the DC offset regulating signals 100, 100, [QA+x1], [QB+x1+y1] is smaller than the second lowest-energy variation, the storing module 705 stores the energy variation corresponding to the DC offset regulating signals 100, 100, [QA+x1], [QB+x1+y1]. In step S2607, the reading module 702 reads another member, such as: 2δ, in the previous group x2, that is, the first group x2. In step S2608, the regulating module 703 maintains the regulated second group of DC offset regulating signals, such as: QA=[QA+x1], QB=[QB+x1+y1], and adjusts the first group of DC offset regulating signals, such as: IA=[IA+2δ] and IB=[IB+2δ]. In step S2609, the reading module 702 reads an energy variation corresponding to the DC offset regulating signals 101, 101, [QA+x1], [QB+x1+y1]. In step S2610, the determining module 704 determines whether the energy variation corresponding to the DC offset regulating signals 101, 101, [QA+x1], [QB+x1+y1] is smaller than the previous one, that is, the energy variation corresponding to the DC offset regulating signal 100, 100, [QA+x1], [QB+x1+y1]. In step S2611, if the energy variation corresponding to the DC offset regulating signals 101, 101, [QA+x1], [QB+x1+y1] is greater than the previous one, the previous energy variation is determined to be a third lowest-energy variation corresponding to [IA+x2], [IB+x2], [QA+x1], [QB+x1+y1].

If the energy variation corresponding to 101, 101, [QA+x1], [QB+x1+y1] is smaller than the previous one, return to step S2606.

In step S2605, if the energy variation corresponding to 100, 100, [QA+x1], [QB+x1+y1] is greater than the second lowest-energy variation, the reading module 702 reads one member in the second group x2, such as: −δ. Then, step S2508 is performed again.

Figure 7:
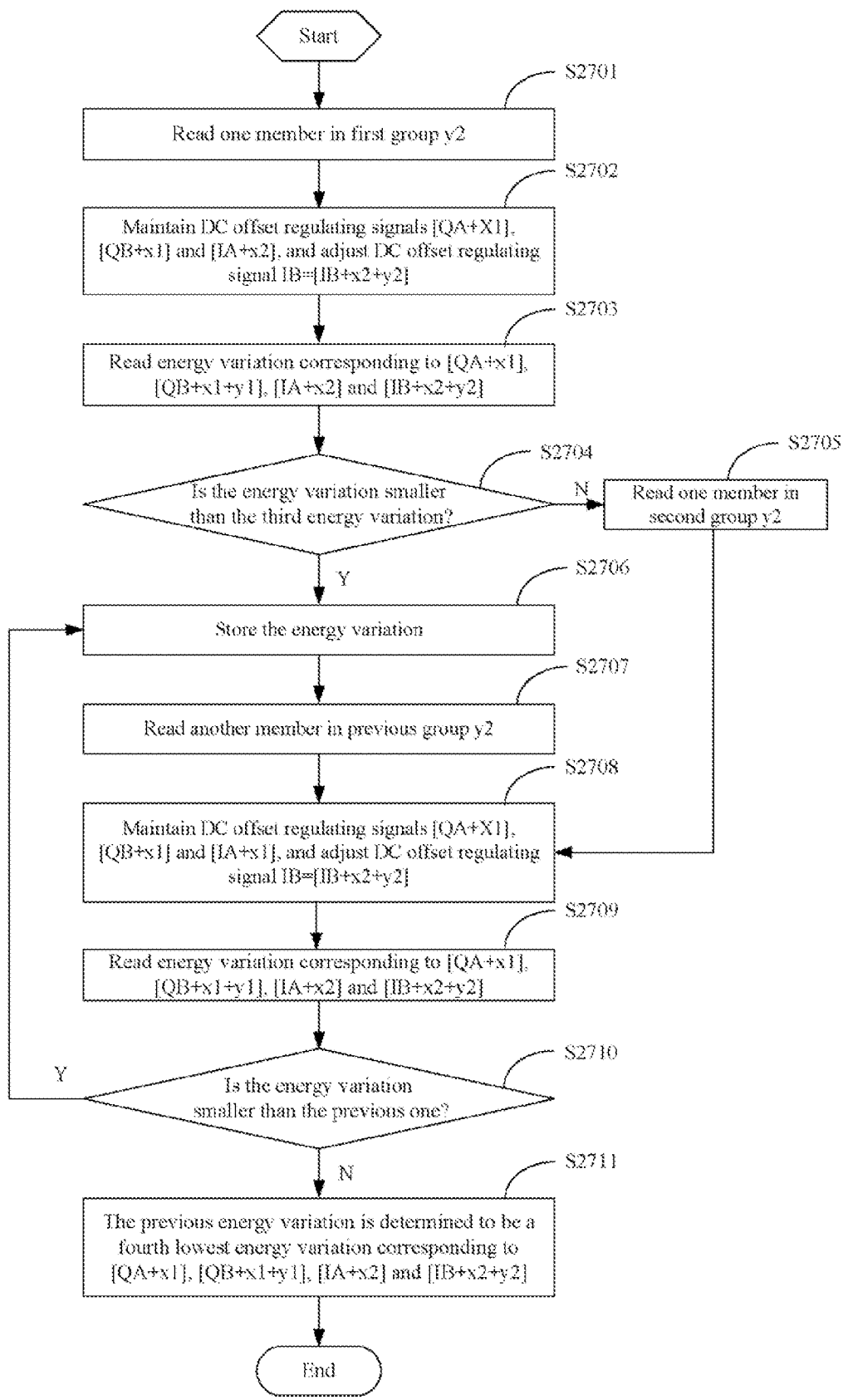
FIG. 7 is a detailed flowchart of a step S270 of FIG. 3 of the present invention.

FIG. 7 is a detailed flowchart of step S270 of FIG. 3 of the present invention. In step S2701, the reading module 702 reads one member of the first group y2, such as: δ. In step S2702, the regulating module 703 maintains the regulated second group of DC offset regulating signals, such as: QA=[QA+x1], QB=[QB+x1+y1] and maintains one of the regulated first group of DC offset regulating signals, such as: IA=[IA+x2], and adjusts the other one of the first group of DC offset regulating signals, such as: IB=[IB+x2+δ]. In step S2703, the reading module 702 reads an energy variation corresponding to [IA+x2], [IB+x2+δ], [QA+x1], [QB+x1+y1]. In step S2704, the determining module 704 determines whether the energy variation corresponding to [IA+x2], [IB+x2+δ], [QA+x1], [QB+x1+y1] is smaller than the third energy variation.

In step S2706, if the energy variation corresponding to the DC offset regulating signals [IA+x2], [IB+x2+δ], [QA+x1], [QB+x1+y1] is smaller than the third lowest-energy variation, the storing module 705 stores the energy variation corresponding to the DC offset regulating signals [IA+x2], [IB+x2+δ], [QA+x1], [QB+x1+y1]. In step S2707, the reading module 702 reads another member, such as: 2δ, in the previous group y2, that is, the first group y2. In step S2708, the regulating module 703 maintains the regulated second group of DC offset regulating signals, such as: QA=[QA+x1], QB=[QB+x1+y1] and maintains one of the regulated first group of DC offset regulating signals, such as: IA=[IA+x2], and adjusts the other one of the first group of DC offset regulating signals, such as: IB=[IB+x2+δ]. In step S2709, the reading module 702 reads an energy variation corresponding to [IA+x2], [IB+x2+2δ], [QA+x1], [QB+x1+y1]. In step S2710, the determining module 704 determines whether the energy variation corresponding to [IA+x2], [IB+x2+2δ], [QA+x1], [QB+x1+y1] is smaller than the previous one, that is, the energy variation corresponding to the DC offset regulating signal [IA+x2], [IB+x2+δ], [QA+x1], [QB+x1+y1]. In step S2711, if the energy variation corresponding to the DC offset regulating signals [IA+x2], [IB+x2+2δ], [QA+x1], [QB+x1+y1] is greater than the previous one, the previous energy variation is determined to a fourth lowest-energy variation corresponding to [IA+x2], [IB+x2+y2], [QA+x1], [QB+x1+y1]. If the energy variation corresponding to [IA+x2], [IB+x2+2δ], [QA+x1], [QB+x1+y1] is smaller than the previous one, return to step S2706.

In step S2705, if the energy variation corresponding to [IA+x2], [IB+x2+δ], [QA+x1], [QB+x1+y1] is greater than the third lowest-energy variation, the reading module 702 reads one member in the second group y2, such as −δ. Then, step S2708 is performed again.

In the present invention, the system utilizing the DC offset correcting module 70 can obtain a lowest DC offset, thereby saving energy in a communication network system.

While embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A system for correcting a direct current (DC) offset in a wireless communication system, comprising:
   a digital-to-analog (D/A) converter module, for converting digital DC offset regulating signals to analog DC offset regulating signals;
   a summing circuit, for summing up the analog DC offset regulating signals and corresponding vectors of a received base band signal;
   an inphase-to-quadrature (I/Q) modulator, for receiving the summed base band signal and converting the summed base band signal to a radio frequency (RF) signal;
   a spectrum analyzer module, for analyzing an energy variation according to a DC offset contained in the RF signal; and
   a DC offset correction module, for adjusting the digital DC offset regulating signals to obtain the lowest energy variation.

2. The system for correcting DC offset as claimed in claim 1, wherein the DC offset correction module comprises:
   an initializing module for initializing the DC offset regulating signals;
   a reading module for reading the energy variation analyzed by the spectrum analyzer;
   a regulating module for adjusting the digital DC offset signals to obtain a lowest energy variation;
   a determining module for determining whether the energy variation is a lowest one; and
   a storing module for storing the energy variation if the energy variation is the lowest one.

3. The system for correcting DC offset as claimed in claim 1, wherein the digital DC offset correction module outputs an RF signal.

4. The system for correcting DC offset as claimed in claim 3, further comprising a converter circuit for converting the RF related digital signal output from the DC offset correction module to another base band signal.

5. The system for correcting DC offset as claimed in claim 4, further comprising a multiplexer connected to the converter circuit and the D/A converter module.

6. The system for correcting DC offset as claimed in claim 1, further comprising a differential amplifier module connected to the summing circuit, wherein the received base band signal comprises vectors I and Q, and the differential amplifier module is used for converting the vectors I and Q of the received base band signal to differential vectors I and Q and transmitting the differential vectors I and Q to the summing circuit.

7. A method for correcting direct current (DC) offset in a wireless communication system via adjusting DC offset regulating signals IA, IB, QA and QB, wherein IA and IB are defined as a first group of DC offset regulating signals, and QA and QB are defined as a second group of DC offset regulating signals, comprising:
   initializing DC offset regulating signals;
   reading an initial energy variation;
   storing the initial energy variation;
   maintaining a first group of DC offset regulating signals and adjusting a second group of DC offset regulating signals to obtain a first lowest-energy variation;
   maintaining a first group of DC offset regulating signals and one of the second group of DC offset regulating signals, and adjusting the other one of the regulated second group of DC offset regulating signals to obtain a second lowest-energy variation;

maintaining a second group of DC offset regulating signals and adjusting a first of DC offset regulating signals to obtain a third lowest-energy variation; and maintaining the regulated second group of DC offset regulating signals and one of the regulated first group of DC offset regulating signals, and adjusting the other one of the regulated first group of DC offset regulating signals to obtain a fourth lowest-energy variation;

wherein the step of maintaining a first group of DC offset regulating signals and adjusting a second group of DC offset regulating signals to obtain a lowest energy variation comprises:

reading one member in a first group x1;

maintaining the first group of DC offset regulating signals IA, IB at the initial value and adjusting the second group of DC offset regulating signals QA=[QA+x1], QB=[QB+x1];

reading an energy variation corresponding to IA, IB, [QA+x1], [QB+x1];

determining whether the energy variation corresponding to IA, IB, [QA+x1], [QB+x1 ] is smaller than the initial energy variation;

when the energy variation corresponding to IA, IB, [QA+x1], [QB+x1] is smaller than the initial energy variation, storing the energy variation corresponding to IA, IB, [QA+x1][QB+x1 ];

reading another member in the previous group x1;

maintaining the first group of DC offset regulating signals IA, IB at the initial value and adjusting the second group of DC offset regulating signals QA=[QA+x1], QB=[QB+x1];

reading an energy variation corresponding to IA, IB, [QA+x1], [QB+x1];

determining whether the energy variation corresponding to IA, IB, [QA+x1], [QB+x1] is smaller than the previous one; and when the energy variation corresponding to IA, IB, [QA+x1], [QB+x1] is greater than the previous one, determining the previous energy variation to be the lowest energy variation corresponding to IA, IB, [QA+x1], [QB+x1].

8. The method for correcting DC offset as claimed in claim 7, wherein the step of determining whether the energy variation corresponding to IA, IB, [QA+x1], [QB+x1] is smaller than the initial energy variation comprising a step of reading one member in a second group x1, if the energy variation corresponding to IA, IB, [QA+x1], [QB+x1] is greater than the initial energy variation.

9. The method for correcting DC offset as claimed in claim 7, wherein the step of determining whether the energy variation corresponding to IA, IB, [QA+x1], [QB+x1] is smaller than the previous one comprising a step of storing the energy variation corresponding to IA, IB, [QA+x1], [QB+x1], if the energy variation corresponding to IA, IB, [QA+x1], [QB+x1] is smaller than the previous one.

10. The method for correcting DC offset as claimed in claim 7, wherein the step of maintaining a first group of DC offset regulating signals and one of the second group of DC offset regulating signals, and adjusting the other one of the regulated second group of DC offset regulating signals to obtain a second lowest-energy variation comprises:

reading one member in a first group y1;

maintaining the first group of DC offset regulating signals IA, IB at the initial value and adjusting the second group of DC offset regulating signals QA=[QA+x1], QB=[QB+x1+y1];

reading an energy variation corresponding to IA, IB, [QA+x1], [QB+x1+yl];

determining whether the energy variation corresponding to IA, IB, [QA+x1], [QB+x1+yl] is smaller than the first lowest-energy variation;

when the energy variation corresponding to IA, IB, [QA+x1], [QB+x1+yl] is smaller than the first lowest-energy variation, storing the energy variation corresponding to IA, IB [QA+x1], [QB+x1+y1];

reading another member in the previous group y1;

maintaining the first group of DC offset regulating signals IA, IB, at the initial value and maintaining QA=[QA+x1], and QB=[QB+x1+y1];

reading an energy variation corresponding to IA, IB, [QA+x1], [QB+x1+y1];

determining whether the energy variation corresponding to IA, IB, [QA+x1], [QB+x1+y1 ] is smaller than the previous one; and when the energy variation corresponding to IA, IB, [QA+x1], [QB+x1+y1] is greater than the previous one, determining the previous energy variation to be the lowest energy variation corresponding to IA, IB, [QA+x1], [QB+x1+y1].

11. The method for correcting DC offset as claimed in claim 10, wherein the step of determining whether the energy variation corresponding to IA, IB, [QA+x1], [QB+x1+y1] is smaller than the first lowest-energy variation comprises a step of reading one member in a second group y1, if the energy variation corresponding to IA, IB, [QA+x1], [QB+x1+y1] is smaller than the first lowest-energy variation.

12. The method for correcting DC offset as claimed in claim 10, wherein the step of determining whether the energy variation corresponding to IA, IB, [QA+x1], [QB+x1+y1 ] is smaller than the previous one comprises a step of storing the energy variation corresponding to IA, IB, [QA+x1], [QB+x1+y1], if the energy variation corresponding to IA, IB, [QA+x1], [QB+x1+y1] is smaller than the previous one.

13. The method for correcting DC offset as claimed in claim 7, wherein a step of maintaining a second group of DC offset regulating signals and adjusting a first group of DC offset regulating signals to obtain another lowest energy variation comprises:

reading one member in a first group x2;

maintaining the second group of DC offset regulating signals QA=[QA+x1], QB=[QB+x1] and adjusting the first group of DC offset regulating signals IA =[IA+x2], IB=[IB+x2];

reading an energy variation corresponding to [IA+x2], [IB+x2], [QA+x1], [QB+x1];

determining whether the energy variation corresponding to [IA+x2], [IB+x2], [QA+x1], [QB+x1] is smaller than the second lowest-energy variation;

when the energy variation corresponding to [IA+x2], [IB+x2], [QA+x1], [QB+x1] is smaller than the second lowest energy variation;

reading another member in the previous group x2;

maintaining the second group of DC offset regulating signals QA=[QA+x1], QB=[QB+x1+y1] and adjusting the first group of DC offset regulating signals IA=[IA+x2], IB=[IB+x2];

reading an energy variation corresponding to [IA+x2], [IB+x2], [QA+x1], [QB+x1+y1];

determining whether the energy variation corresponding to [IA+x2], [IB+x2], [QA+x1], [QB+x1+y1] is smaller than the previous one; and when the energy variation corresponding to [IA+x2], [IB+x2], [QA+x1], [QB+x1+y1] is greater than the previous one, determining the previous energy variation to be a third lowest-energy variation corresponding to [IA+x2], [IB+x2], [QA+x1], [QB+x1+y1].

14. The method for correcting DC offset as claimed in claim 13, wherein the step of determining whether the energy variation corresponding to [IA+x2], [IB+x2], [QA+x1], [QB+x1] is smaller than the second lowest energy variation comprises a step of reading one member in a second group x2, if the energy variation corresponding to [IA+x2], [IB+x2], [QA+x1], [QB+x1] is greater than the second lowest-energy variation.

15. The method for correcting DC offset as claimed in claim 13, wherein the step of determining whether the energy variation corresponding to [IA+x2], [IB+x2], [QA+x1], [QB+x1+y1] is smaller than the previous one comprises a step of storing the energy variation corresponding to [IA+x2], [IB+x2], [QA+x1], [QB+x1+y1], if the energy variation corresponding to [IA+x2], [IBx30 x2], [QA+x1], [QB+x1+y1] is smaller than the previous one.

16. The method for correcting DC offset as claimed in claim 7, wherein the step of maintaining the regulated second group of DC offset regulating signals and one of the regulated first group of DC offset regulating signals, and adjusting the other one of the regulated first group of DC offset regulating signals to obtain a fourth lowest-energy variation comprises;
reading one member in a first group y2;
maintaining the DC offset regulating signals QA=[QA+x1], QB=[QB+x1+y1], IA=[IA+x2] and adjusting the DC offset regulating signal IB=[IB+x2+y2];
reading an energy variation corresponding to [IA+x2], [IB+x2+y2], [QA+x1], [QB+x1+yl]; determining whether the energy variation corresponding to [IA+x2], [IB+x2+y2], [QA+x1], [QB+x1+y1] is smaller than the third lowest-energy variation;
when the energy variation corresponding to [IA+x2], [IB+x2+y2], [QA+x1], [QB+x1+y1] is smaller than the third lowest-energy variation, storing the energy variation corresponding to [IA+x2], [IB+x2+y2], [QA+x1], [QB+x1+y1];
reading another member in the previous group y2;
maintaining the DC offset regulating signals QA=[QA+x1], QB=[QB+x1+y1], IA=[IA+x2] and adjusting the DC offset regulating signal IB=[IB+x2+y2];
reading an energy variation corresponding to [IA+x2], [IB+x2+y2], [QA+x1], [QB+x1+y1];
determining whether the energy variation corresponding to [IA+x2], [IB+x2+y2], [QA+x1], [QB+x1+y1] is smaller than the previous one; and
when the energy variation corresponding to [IA+x2], [IB+x2+y2], [QA+x1], [QB+x1+y1] is greater than the previous one, determining the previous energy variation to be a fourth lowest-energy variation corresponding to [IA+x2], [IB+x2+y2], [QA+x1], [QB+x1+y1].

17. The method for correcting DC offset as claimed in claim 16, wherein the step of determining whether the energy variation corresponding to [IA+x2], [IB+x2+y2], [QA+x1], [QB+x1++y1] is smaller than the third lowest-energy variation comprises a step of reading one member in a second group y2, if the energy variation corresponding to [IA+x2], [IB+x2+y2], [QA+x1], [QB+x1+y1] is smaller than the third lowest-energy variation.

18. The method for correcting DC offset as claimed in claim 16, wherein the step of determining whether the energy variation corresponding to [IA+x2], [IB+x2+y2], [QA+x1], [QB+x1+y1] is smaller than the previous one comprises a step of storing the energy variation corresponding to [IA+x2], [IB+x2+y2], [QA+x1], [QB+x1+yl], if the energy variation corresponding to [IA+x2], [IB+x2+y2], [QA+x1], [QB+x1+y1] is smaller than the previous one.

19. A method for correcting direct current (DC) offset in a wireless communication system, comprising steps of:
defining a first group of DC offset regulating signals IA and IB corresponding to a vector I of a differential base band signal transmitted in a wireless communication system;
defining a second group of DC offset regulating signals QA and QB corresponding to a vector Q of said differential base band signal transmitted in said wireless communication system;
adjusting whole regulating signals of a selective one of said first and second groups of DC offset regulating signals by means of adjusting each regulating signal of said selective one of said first and second groups of DC offset regulating signals in a same way as other regulating signals of said selective one of said first and second groups of DC offset regulating signals, and by means of maintaining the other of said first and second groups of DC offset regulating signals unchanged simultaneously so as to retrieve a lowest-energy variation for said whole regulating signals of said selective one of said first and second groups of DC offset regulating signals; and
adjusting said each regulating signal of said selective one of said first and second groups of DC offset regulating signals by means of maintaining said other regulating signals of said selective one of said first and second groups of DC offset regulating signals unchanged, and by means of maintaining said other of said first and second groups of DC offset regulating signals unchanged simultaneously so as to retrieve another lowest-energy variation far said each regulating signal of said selective one of said first and second groups of DC offset regulating signals.

* * * * *